UNITED STATES PATENT OFFICE.

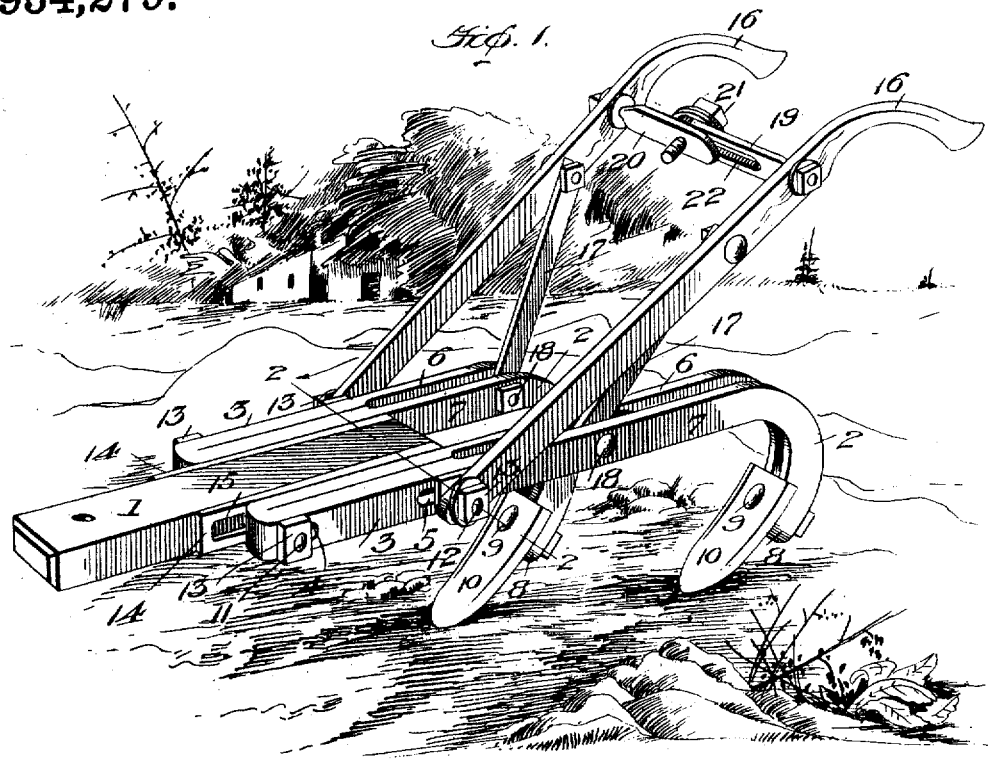

LUTHER C. GREGORY, OF FRIENDSHIP, TENNESSEE.

DOUBLE-SHOVEL PLOW.

954,279. Specification of Letters Patent. Patented Apr. 5, 1910.

Application filed September 20, 1909. Serial No. 518,629.

*To all whom it may concern:*

Be it known that I, LUTHER C. GREGORY, a citizen of the United States, residing at Friendship, county of Crockett, and State of Tennessee, have invented certain new and useful Improvements in Double-Shovel Plows, of which the following is a specification.

This invention relates to double shovel plows.

Among the objects of the present invention is the provision of plow standards of novel construction, whereby they are rendered strong and durable and permit adjustment of the plow shovels to different heights and angles and the use of plow shovels of different sizes; a novel arrangement of the plow standards and beam in connection with spreaders, constructed and arranged in a new manner, whereby the standards may be adjusted laterally to vary, as desired, the distance between the shovels, so that both sides of the row may be plowed, in connection with adjustably connected handles connected to the beam and standards in a novel manner.

The invention is set forth hereinafter and its novelty recited in the appended claim.

In the accompanying drawings: Figure 1 is a perspective; Fig. 2, a detail cross section on line 2—2 of Fig. 1; Fig. 3, a detail perspective of one of the plow standards; and Fig. 4, a detail perspective of one of the wedges.

The plow beam 1 is flanked by the standards 2 which are preferably made of strap metal of sufficient size and thickness formed into a welded part 3 having elongated slots 4 and 5 extending therethrough, and parallel separated parts 6 and 7 whose rear ends are curved downwardly and forwardly at 8 where they receive the adjustable bolts 9 of the shovels 10. By loosening the bolts 9, the respective shovels may be adjusted up or down to the desired extent and secured and different sized shovels may be used on the different standards. When a large shovel is applied to one standard and a small one to the other standard, they may be relatively adjusted up or down on their standards so that the plow will run level. The standards, as thus constructed, possess great strength and durability.

Passing through the slots 4 and 5 and the beam 1 are securing bolts 11 and 12 having nuts 13, which adjustably secure the standards in position.

Interposed between the forward parts 3 of the standards and the beam 1, are wedges 14, each having a slot 15 through which the bolts 11 and 12 pass. By moving these wedges forwardly or rearwardly, the standards may be more or less spread apart, according to the distance desired between the two furrows opened by the shovels 10, the nuts 13 being then tightened to retain the parts in adjusted position. In addition to the wedges 14, which are preferably of metal and carried permanently by the plow, there may be used other wedges, identical in construction with the wedges 14 and also interposed between the parts 3 and the plow beam 1, by means of which a much greater spreading apart of the standards may be obtained. These wedges are not illustrated, as the invention, in this respect, lies in the provision of wedges or spreaders of any kind and number whatsoever between the standards and plow beam.

The plow handles 16 are secured to the bolt 12 at their lower ends, and are braced by members 17 whose lower ends are secured between the parts 6 and 7 of the standards by bolts 18, and are connected by an adjustable brace composed of members 19 and 20 whose ends are screw threaded and pass through the handles 16 and are secured by nuts, the member 20 carrying a screw threaded bolt 21, passing through a slot 22 in the member 19. When the standards are relatively adjusted, the bolt 21 is loosened to permit relative movement of the handles and again tightened to securely brace them.

Having thus described my invention, what I claim as new and desire to secure by Letters Patent, is:—

In a double shovel plow, the combination with a plow beam, of plow standards on opposite sides thereof each of which is provided with two elongated substantially horizontal separate slots, wedges provided with relatively long slots which are disposed, respectively, between the said plow standards and the plow beam, independent bolts passing crosswise through the respective corresponding slots in the plow beam, plow handles which are connected at their lower ends to one of the bolts aforesaid, an adjustable connection between the upper parts of said plow handles, and braces extending upwardly from the standards to the plow handles.

In testimony whereof, I hereunto affix my signature in presence of two attesting witnesses.

LUTHER C. GREGORY.

Witnesses:
Wm. Curtis,
W. F. Parker.